United States Patent [19]

Wilcock

[11] 4,227,753
[45] Oct. 14, 1980

[54] COMPLIANT GAS THRUST BEARING WITH PROFILED AND APERTURED THRUST RUNNER

[75] Inventor: Donald F. Wilcock, Schenectady, N.Y.

[73] Assignee: Mechanical Technology Incorporated, Latham, N.Y.

[21] Appl. No.: 974,260

[22] Filed: Dec. 29, 1978

[51] Int. Cl.³ ............................................. F16C 19/00
[52] U.S. Cl. ..................................... 308/09; 308/160; 308/170
[58] Field of Search ................. 308/9, 15, 135, 130 R, 308/140, 158, 160, 163, 164, DIG. 1, 170

[56] References Cited

U.S. PATENT DOCUMENTS

| 3,186,774 | 6/1965 | Wilcox ................................. 308/9 X |
| 3,809,443 | 5/1974 | Cherubium ............................. 308/9 |

*Primary Examiner*—Frederick R. Schmidt
*Attorney, Agent, or Firm*—Joseph V. Claeys; John M. Neary

[57] ABSTRACT

A compliant gas thrust bearing has a thrust plate on which is mounted an annular, flexible bearing sheet supported by a resilient support member which enables the bearing sheet to deflect under hydrodynamic loads and thermal and misalignment loads. The bearing surface of the thrust runner has formed therein a series of hydrodynamic profiles which facilitate the generation of hydrodynamic supporting gas films during rotation of the thrust runner. A restricted gas inlet port in the thrust runner admits externally pressurized lubricating gas to separate the bearing surfaces of the thrust runner and the bearing sheet during startup and stopping phases of operation and also to enhance the hydrodynamic effect of the thrust runner/compliant bearing surface combination.

24 Claims, 7 Drawing Figures

COMPLIANT GAS THRUST BEARING WITH PROFILED AND APERTURED THRUST RUNNER

BACKGROUND OF THE INVENTION

Hydrodynamic thrust bearings are in wide use in high speed rotating machinery because of their long, trouble free life. Gas thrust bearings have the additional advantages of very low power losses and extreme high temperature capability. In addition, the advantage of eliminating the oil supply, scavenging, cooling, filtering and pressurizing equipment necessary to serve oil bearings makes the air bearing extremely desirable.

Because of these desirable characteristics of gas thrust bearings, they are being considered for applications in which their present capabilities can be exceeded. These applications primarily involve greater loading conditions in which the load carrying capacity of the gas film is exceeded. They also involve rotor unbalance and misalignment conditions wherein the thrust runner is not perfectly parallel to the thrust plate, and also extreme heating conditions wherein the thermal distortion of the bearing members or the rotor causes the thrust runner to carry a disproportionate amount of its load on its inner edge.

The most serious limitation on gas thrust bearings in the past has been their load carrying capacity. Compared to conventional thrust bearings such as ball bearings and the like, the load carrying capacity of conventional gas thrust bearings is relatively low. This limitation has always been regarded as more than offset by the other advantages offered by the gas thrust bearing. However, it would be desirable to increase the load carrying capacity. One way of increasing the load carrying capacity is by increasing the size of the bearing surface, but this expedient may be precluded by the size limitations of the machine in which the bearing is going to be located, and has the disadvantage that the power loss in a thrust bearing increases as the fourth power of the bearing diameter.

Accordingly, it would be extremely advantageous to be able to increase the load capacity of a gas thrust bearing without increasing the bearing diameter.

SUMMARY OF THE INVENTION

It is thus an object of this invention to provide a thrust bearing having greatly improved load carrying capacity. This bearing has the additional advantage that it is inherently cool running and much longer lasting than conventional thrust bearings. It is more tolerant of misalignment and eccentric loading conditions than conventional thrust bearings and yet it is less expensive to manufacture than the conventional bearings. The repair of this bearing is simple, fast and inexpensive, and in most cases can be accomplished in the field.

These and other objects of the invention are achieved by one embodiment thereof having a thrust plate and an opposed thrust runner defining therebetween a gap in which is located an annular resilient bearing assembly including an annular bearing sheet supported by an underlying resilient support member. The bearing surface of the thrust runner has formed therein hydrodynamic profiles which facilitate the generation of hydrodynamic supporting fluid cushions. The resilient support member compliantly supports the bearing sheet to enable it to deflect and conform to the shape and slope of the thrust runner, and the shape and position of the hydrodynamic fluid cushion under the thrust runner. The hydrodynamic profiles in the thrust runner combined with the compliant bearing surface of the thrust plate provide superior hydrodynamic effect. In addition, hydrostatic fluid inlet ports are provided in the thrust runner to convey externally pressurized hydrostatic lubricating fluid to the bearing interface to enhance the supporting hydrodynamic fluid film and also to provide cooling fluid flow to lower the temperature of the thrust runner.

DESCRIPTION OF THE DRAWINGS

The invention and its objects will become more clear upon reading the following detailed description of the preferred embodiment, in conjunction with an examination of the following drawings, wherein.

DESCRIPTION OF THE PREFERRED EMBODIMENT

Figure 1:
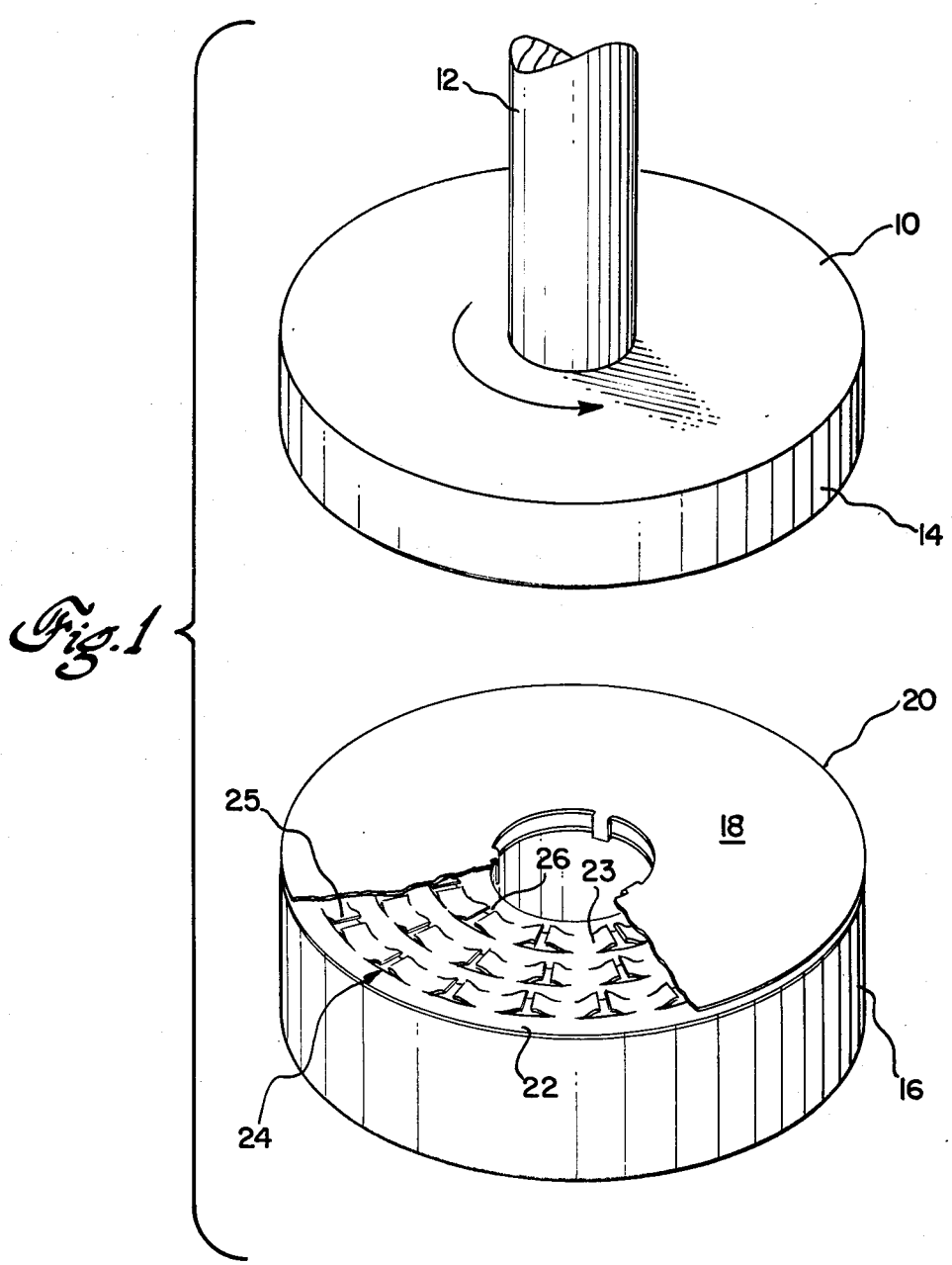
FIG. 1 is a perspective view of a thrust bearing according to this invention.

Referring now to the drawings, wherein like reference characters designate identical or corresponding parts, and more particularly to FIG. 1 thereof, a thrust bearing is shown having a thrust runner 10 mounted on a rotating rotor such as a shaft 12. The thrust runner has an axially facing bearing surface 14, facing a stationary thrust plate 16 having an axially facing bearing surface 18 in opposed bearing relationship to the bearing surface 14 on the thrust runner 10. The bearing interface defined by bearing surfaces 14 and 18 supports the shaft 12 in the upward axial direction in FIG. 1. Normally, there will be a second pair of bearing surfaces providing a bearing interface that will support the shaft in the downward axial direction in FIG. 1. Often, the top surface of the same thrust runner 10 can be used as one of the bearing surfaces in this second bearing interface, but, for simplicity and clarity of illustration, it is not shown in the drawing.

Figure 1A:
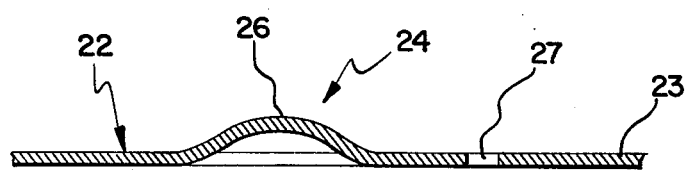
FIG. 1A is a sectional elevation of a section of an alternative resilient support element.

The bearing surface 18 is provided by a thin, flexible bearing sheet in the form of an annulus which lies atop and is supported by a support element 22. The support element 22 is a thin metal plate 23, approximately 18 microns thick, having formed therein a series of regular raised resilient projections 24 which resiliently support the bearing sheet 20 on a matrix of spaced support zones while allowing it to deflect under hydrodynamic forces generated across the bearing surface 18 of the sheet 20, and also under misalignment forces and transient axial forces which cause the thrust runner 10 to tilt or translate toward the thrust plate 16. The projections 24 are formed by raised leaves 25 which are slit around three sides and then bent out of the plane of the plate 23. In practice, the projections 24 can be formed in a punch press which shears the outline of the leaves 25 and bends them out of the plate 23 in one operation. The leaves 25 can be arranged facing each other as shown in FIG. 1, somewhat in the form of a bump split along and separated at its crest 26. Alternatively, as shown in FIG. 1A, the leaf could be in the form of a bump slit at one end 27 instead of at the bump crest 26. Other forms of projections are also contemplated, including the annular corrugated support element illustrated in U.S. Pat. No. 3,809,443, or the support elements disclosed in the copending applications of Miller, Ser. No. 974,262 entitled "Compliant Hydrodynamic Fluid Bearing with Resilient Support Matrix," and of Gray et. al., Ser. No. 972,263 entitled "Improved Support Element for Compliant Hydrodynamic Journal Bearing", both filed concurrently herewith, the disclosures of which are incorporated herein by reference.

The essential feature of the resilient supporting element 22, whatever its design, is a stiffness that is less than the fluid film stiffness. This ensures that the support element will deflect before the fluid film is breached, so that metal-to-metal contact between the rotor and the bearing sheet will not occur. The annular support elements 22 shown in FIGS. 1 and 1A are preferred because the supporting projections 24 can each act independently of the others, so that when one area of the bearing sheet 20 is deflected downwardly, the leaves of the projections 24 can deflect downwardly without causing deflection in any other part of the support element 22. This feature enables the bearing to tolerate misalignment and thermal distortion, as explained for fully below.

Figure 2:
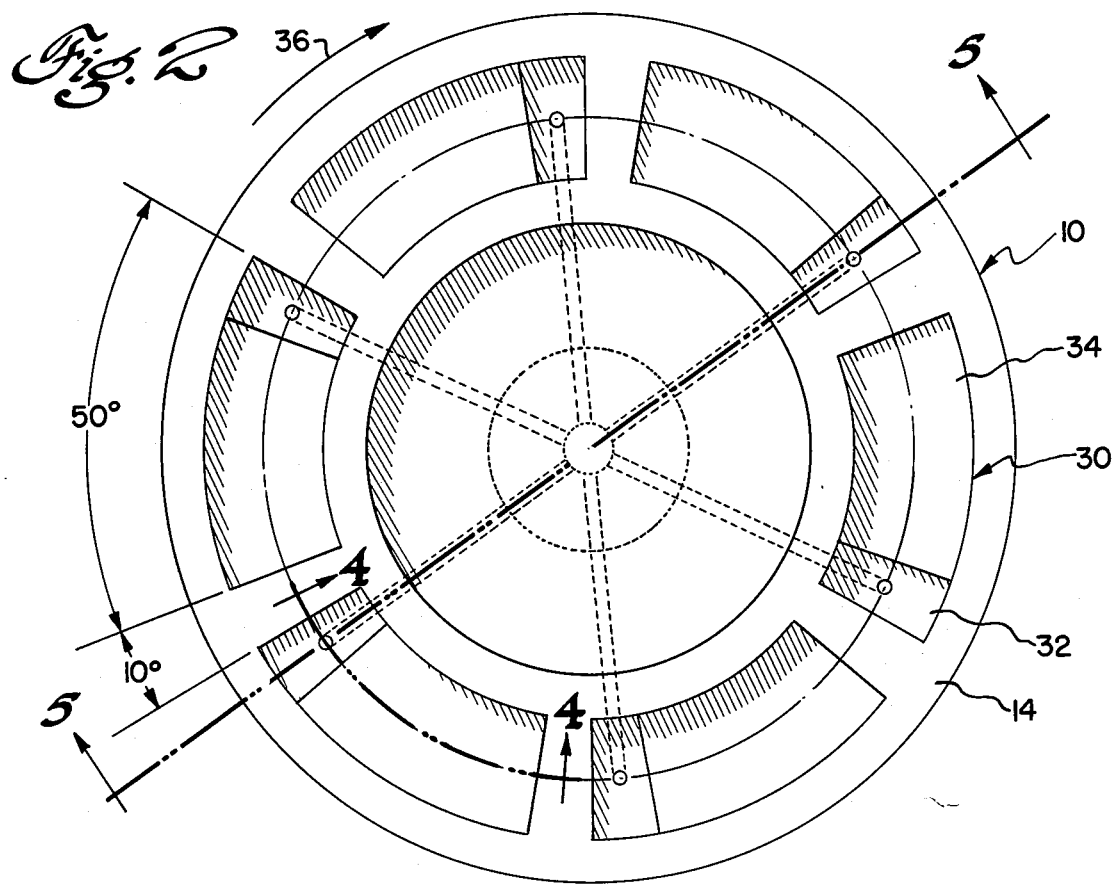
FIG. 2 is a plan view of the underside of the thrust runner shown in FIG. 1.
Figure 4:
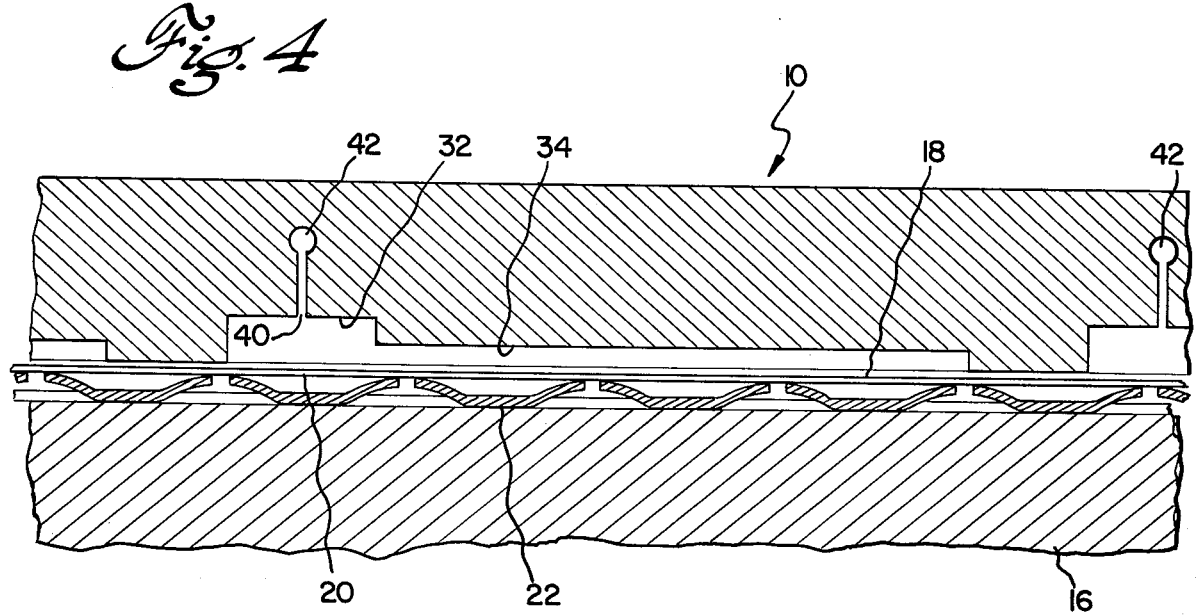
FIG. 4 is an elevation of the thrust bearing shown in FIG. 1 along lines 4—4 in FIG. 2.

Referring now to FIGS. 2 and 4, the bearing surface 14 of the thrust runner 10 has formed therein a plurality of hydrodynamic profiles 30. A hydrodynamic profile is a recess formed in the bearing surface of a bearing member which promotes the generation of hydrodynamic supporting fluid pressure upon rotation relative to another closely spaced bearing surface.

The theory of operation of the hydrodynamic bearing will now be briefly described. As the thrust runner 10 rotates across the surface of the opposed bearing surface; such as the bearing sheet 20, it carries along its boundary layer of fluid. The layer of fluid adjacent the boundary layer is also swept along with the thrust runner by action of the viscous fluid forces which resist shearing in adjacent planes. For the same reason, the next adjacent layer is also carried along, and so on. Thus, a velocity gradient is established in the fluid film under the thrust runner, with the boundary layer moving as fast as the thrust runner and the fluid at some distance away being stationary.

Figure 3:
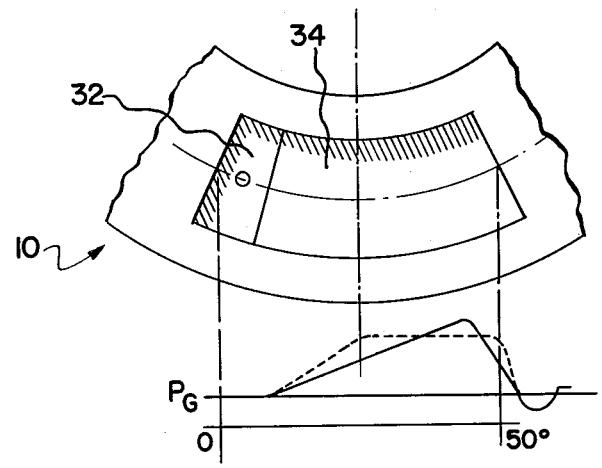
FIG. 3 is a pressure diagram for one of the hydrodynamic profiles in FIG. 2.

The hydrodynamic profile shown in FIGS. 2 and 3 is in the form of a shrouded and stepped recess, including a plenum or supply cavity 32 approximately 0.003 inches deep, and a shallower step zone 34 approximately 0.001 inches deep. These dimensions can vary depending on the lubricating fluid used, such as air, oil, water, and on the dimensions and load carrying capacity of the bearing. As the thrust runner 10 rotates in the direction indicated by the arrow 36, lubricating fluid is supplied to the supply cavity 32, either from ambient fluid in the bearing interface or through a supply port. The fluid in this supply cavity flows onto the step area 34 where it is carried by the viscous action of the boundary layer in the bottom of the step 34 toward the rear of the step. The pressure of the fluid in step 34 gradually increases toward the rear of the step to a high pressure area adjacent the rear or downstream edge. The high pressure cushion of fluid thus formed in this step 34 by action of the relative movement between the thrust runner 10 and the bearing sheet 20 thus supports the thrust runner 10 on the bearing sheet 20.

The compliant bearing surface of bearing sheet 20 cooperates with the capability of the recesses 30 to generate hydrodynamic fluid cushions to produce a bearing which is superior to the sum of the advantages offered by a compliant surface and hydrodynamic recesses separately. The fluid cushion developed in the recess 30 tends to be trapped by the compliant bearing sheet 20 within the recess thereby developing greater pressures than would otherwise be possible because the bearing sheet 20 conforms very closely to the shrouded (inside and outside) edges of the recess. Normally in a hydrodynamic bearing having recesses of this nature in opposition to a rigid bearing face, the thrust runner and the opposed rigid bearing face can both become deformed under centrifugal and thermal loads, thereby changing the dimensions of the gap between the two bearing faces, allowing pressurized fluid from the recess to escape and thereby lowering the load carrying capacity of the bearing. In addition, loading fluctuations on the thrust runner can cause transient excursions and other deflections on the thrust runner relative to the thrust plate which also cause deviations from the optimum spacing between the two bearing surfaces and further lowering the load carrying capacity of the bearing.

The compliant nature of the bearing sheet 20 enables it to conform closely to the radial edges of the recess 30 and also to deflect in the area of the center of the recess 30 to cause the pressure over the recess to build more rapidly and to hold a plateau for a portion of the angular length of the step portion 34 of the recess 30. I believe the pressure diagram over this recess in combination with an opposed compliant bearing surface is shown in FIG. 3. It shows the pressure building over the step portion 34 of the recess to a high value at approximately half of the length of the step portion and then holding that high value to the end of the step. This is in contrast to the conventional hydrodynamic recesses wherein the pressure builds gradually to a peak in an area near the end of the recesses, then drops off sharply. FIG. 3 illustrates the improved load carrying capacity of the hydrodynamic recess when used in combination with a compliant bearing surface.

As the thrust runner 10 rotates, the cushions of high pressure supporting fluid adjacent the recesses 30 are carried with the recesses around the face of the bearing sheet 20. This causes periodic deflections of the bearing sheet 20. The deflections of the bearing sheet are permitted by deflections of the resilient compliant leaves 25 of the projections 24. These deflections are accompanied by sliding or coulomb movement of the leaves 25 against the thrust plate 16, producing coulomb damping which contributes to the suppression of any incipient fluid whirl which might tend to develop in this bearing because of the smooth and uninterrupted surface of the bearing sheet 20.

Theoretically, the hydrodynamic profiles could be etched in the flexible bearing sheet instead of the thrust runner to achieve some of the advantages of this invention. However, I prefer the arrangement disclosed primarily becaause it provides longer life in high load situations. The bearing sheet in a compliant bearing cntinually flexes in operation, so fatigue strength must be a consideration in a bearing of this nature. Forming grooves and recesses in the thin bearing sheet can provide the initiating source of fatigue cracks and thereby shorten the life of the bearing. In addition, the injection of hydrostatic lubricating fluid into the bearing interface from the thrust runner could not be done as precisely if the profiles were in the bearing sheet.

The hydrodynamic effect of the thrust runner 10 rotating in relation to the bearing sheet 20 depends for its generation on the relative movement of the thrust runner 10 over the bearing sheet 20. To provide a supporting cushion of air when the hydrodynamic effect is not operative, as during the start-up and stop phases of operation of the machine, and to provide additional load capacity, provision can be made for injection of hydrostatic pressurized fluid into the bearing interface.

Hydrostatic lubricating fluid is injected into the bearing interface through a restricted fluid inlet port 40 opening in the bottom of each of the supply cavities 32 of the recess 30. When the lubricating fluid used is a gas, careful attention must be given to tuning the recess 30 to avoid "pneumatic hammer". Various possibilities are to eliminate the supply cavity 32 and/or minimizing the total volume of the recess 30. The inlet ports 40 are fed by radially extending conduits 42 which extend to the axial central line of the shaft 12 and there communicate with a fluid passage 44 which is the main fluid supply passage for the bearing. The fluid may be pressurized by an externally driven pump or compressor or, if the thrust bearing is on a machine which generates fluid pressure as part of the machine function, such as a turbine/compressor or liquid pump, the fluid may be supplied under pressure by the machine.

If the bearing interface for exerting a downwardly directed axial force on the shaft 12 is on the top surface of the thrust runner 10, inlet ports like inlet ports 40 may connect with the conduits 42 for conveying fluid under pressure to the oppositely facing bearing surface on the thrust runner 10.

The lubricating fluid conveyed through fluid passage 44, conduits 42 and inlet ports 40 provide the additional function of cooling the thrust runner 10. The constant flow of fluid through the fluid passages, across the bearing surfaces, and out of the bearing, carries away heat that is generated at the bearing surface by virtue of the viscous or shearing forces acting on the fluid in the bearing interface. This heat could otherwise tend to establish an axial temperature gradient across the thrust runner, causing the thrust runner to expand nonuniformly and to assume a convex face at the bearing surface 14. The outside edges of the bearing surface 14 would lift away from the opposing bearing surface, permitting pressurized fluid in the bearing interface to escape, and shifting a disproportionate amount of the bearing load to the inside edge. To some extent, this thermal distortion of the thrust runner can be accommodated by the compliant bearing surface 18 of the bearing sheet 20 because of the compliance of the support projections 24; however, it is preferable to reduce as much as possible the thermal distortion of the thrust runner 10.

Figure 5:
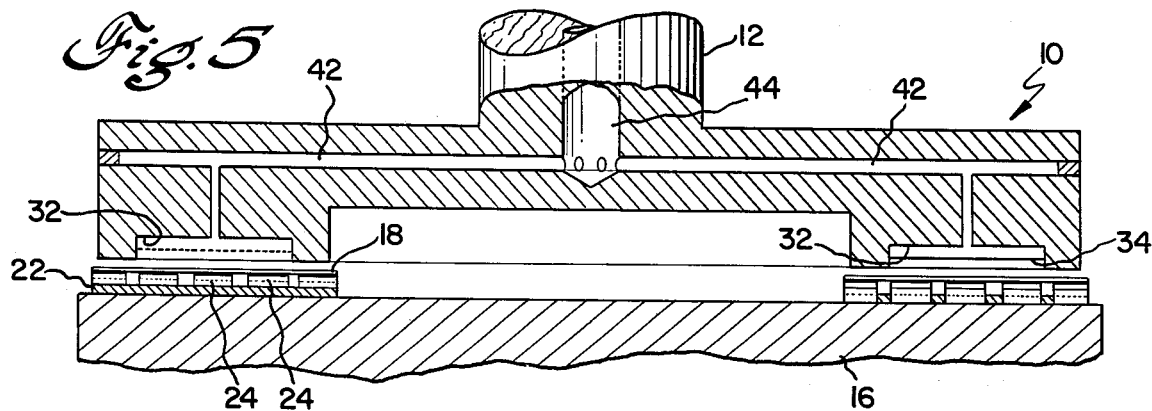
FIG. 5 is an elevation of the thrust bearing shown in FIG. 1 along lines 5—5 in FIG. 2.
Figure 6:
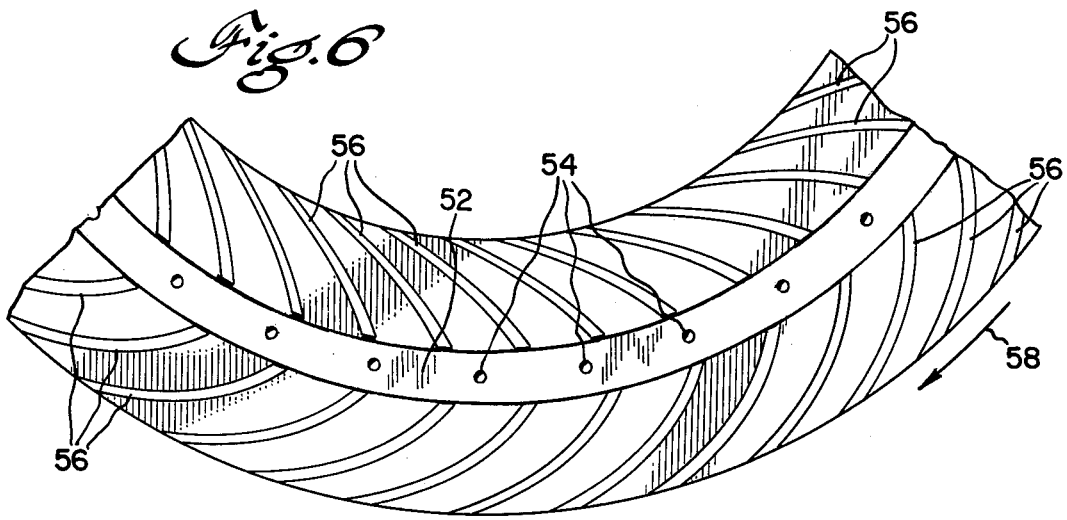
FIG. 6 is a partial plan view of the bearing face of a second embodiment of a thrust runner in accordance with this invention.

Other hydrodynamic profiles than the shrouded, stepped recess illustrated in FIGS. 2 and 4 are contemplated. For example, the single unshrouded step, tapered land, shrouded taper, helical groove, and herringbone patterns are also believed to be applicable for use in this invention. One such modification is illustrated in FIG. 6. It employs a central circumferential slot 50 in the floor of a shallow plenum or step 52. The fluid under pressure is fed into the slot 50 through a series of restricted inlet ports 54 communicating with radial conduits 42 (not shown) similar to those shown in FIG. 4. The portions of the bearing face of the thrust runner shown in FIG. 5 on both radial sides of the step 52 have machined therein a series of parallel helical grooves 56.

In operation, the embodiment shown in FIG. 6 rotates in the direction indicated by the arrow 58. Fluid is drawn through the helical grooves 56 and collects in the step 52 where it acts as a supporting cushion to support the thrust runner 10 on the compliant bearing surface 18 of the bearing sheet 20 (shown in FIG. 1).

The pressurized fluid admitted through inlet ports 54 from the external source is effective to establish a supporting fluid cushion during start-up and slow-down phases of the operation when the hydrodynamic effect is not yet operative. In addition, the pressure of this externally supplied fluid also increases the supply and pressure of the fluid cushion in the step 52 which is created by the hydrodynamic effect of the helical grooves 56 to provide a higher pressure cushion over a larger area for enhanced load carrying capacity.

The operation of the embodiment of FIG. 6 will be somewhat different from the embodiment of FIGS. 2 and 4. Instead of a series of separate fluid cushions carried around across the face of the bearing sheet 20 by the hydrodynamic recesses 30, an annular cushion of fluid will be established over the annular step 52 and will represent a more static condition to the bearing sheet 20. That is, the resilient support element will deflect locally under the fluid film pressure, enabling the bearing sheet to assume a slight annular depression radially aligned with the fluid cushion over the step 52, and this annular depression in the bearing sheet 20 will remain approximately static, at least compared to the continuous flexing that the bearing sheet will experience in the embodiments of FIGS. 2 and 4. The bearing sheet will tend to seal the fluid cushion in the step 52 on both radial sides of this step and will also function to accommodate transient excursions and deflections of the thrust runner 10 in the same manner as explained above for the embodiments of FIGS. 2 and 4.

It may be desirable to adjust the stiffness of the support element 22 so that the radial outside edges of the bearing assembly are more compliant than the center portion of the annulus. As explained in the co-pending application of Gray et al filed concurrently herewith, the tolerance of the bearing to misalignment loads can be improved by adjusting the stiffness of the bearing assembly to provide a stiffness gradient in the direction perpendicular to the direction of movement of the thrust runner. Alternatively, in installations in which the occurrence of misalignment or rotor imbalance loads is well controlled, it may be desirable to increase the stiffness of the radial outside and inside edges of the bearing assembly so that the bearing sheet 20 conforms more closely to the bearing surface 14 of the thrust runner and the central annular area of the bearing sheet 20 is made more compliant than the inside and outside edges to provide a larger pocket for accommodating and uniformly distributing the pressurized support cushion of fluid. Thus, it can be seen that the design of the support element 22 provides the flexibility needed to optimize the support characteristics for the bearing sheet 20 to the particular requirements of the application involved.

The stiffness of the support element 22, or selected portions thereof, can be adjusted by selecting the dimensions of the leaves 25 of the resilient projections 24. For example, by making the leaves short and wide, the stiffness of the projections can be increased. By making the leaves long and narrow, the compliance of the projections is increased. Finally, the spacing between adjacent projections can be varied to change the compliance of areas of the support element and also the uniformity of support.

The hydrodynamic profile on the thrust runner affords numerous advantages. It makes repair of the bearing simple, fast and inexpensive because any damage that occurs will normally be restricted to the compliant bearing assembly, which is easily replaced, rather than the thrust runner. The thrust runner is normally an integral part of the rotor and its repair requires removal of the rotor from the housing which itself is an expensive and time-consuming undertaking, requiring much labor and down time of the machine; whereas replacement of the compliant bearing assembly does not require extensive disassembly or down time.

The injection of hydrostatic lubricating and cooling fluid into the supply groove in the hydrodynamic profile assumes the optimum use of this fluid. If the hydrodynamic profile were formed in the bearing sheet, with the inlet port in the thrust runner, the injection of lubricating fluid would not cooperate as well with the hydrodynamic action of the bearing, and might actually interfere with that action in some situations.

The bearing of this invention affords greatly improved load carrying capacity by the interaction of the compliant bearing surface and the profiled thrust runner, and also by the cooperation of the hydrostatic action with this combination. They provide an increased fluid pressure over a greater load supporting area, and the compliant bearing sheet conforms closely with the thrust runner to retain and distribute this supporting fluid film, thereby increasing the load carrying capacity even in the presence of misalignment and eccentric loading conditions.

Obviously, numerous variations and modifications of the embodiments of the invention disclosed herein are possible. For example, the invention could be embodied in a journal bearing wherein the hydrodynamic recesses are in the surface of the rotating shaft, and the crests of the leaves lie perpendicular to the direction of motion of the rigid bearing surface; that is, parallel to the shaft axis.

These variations and modifications, and equivalents thereof, are expressly intended to be part of my invention and may be practiced while remaining within the spirit and scope of the invention as defined in the appended claims, wherein I claim:

1. A compliant fluid thrust bearing, comprising:
   a thrust plate and a relatively movable thrust runner, defining therebetween a gap for receiving a compliant bearing assembly;
   a compliant bearing assembly disposed within said gap and including a flexible bearing sheet facing said thrust runner, and a resilient supporting element operatively engaged with said thrust plate for resiliently supporting said bearng sheet;
   said thrust runner having an axially facing bearing surface facing said bearing assembly, and said bearing sheet having an axially facing bearing surface facing the bearing surface at said thrust runner;
   said thrust runner having formed on said bearing surface thereof a profile which induces hydrodynamic supporting fluid pressure areas to support said thrust runner upon movement thereof relative to said sheet; and
   means in said thrust runner defining openings in the bearing surface thereof for admitting externally pressurized fluid for cooling and hydrostatic purposes.

2. The bearing defined in claim 1, wherein said flexible bearing sheet includes a complete annulus of thin sheet metal.

3. The bearing defined in claim 1, wherein said resilient support element includes a plate having raised bump-form leaves bent out of the plane of said plate.

4. The bearing defined in claim 3, wherein said bump form leaves are formed by slits around three sides of said leaves, one of said slits being parallel to the crest of said bump form.

5. The bearing defined in claim 1, wherein said profile includes a supply cavity in communication with a hydrodynamic pumping recess, said openings communicating with the floor of said supply cavity.

6. A compliant gas thrust bearing for a rotating rotor comprising:
   a thrust plate, and a relatively movable thrust runner on the rotor, defining a gap between the plate and the runner;
   a bearing assembly disposed in said gap and including a flexible bearing sheet and a unitary resilient supporting element;
   said bearing sheet having a bearing surface and a backside on the side opposite said bearing surface;
   said unitary supporting element lying between said bearing sheet and said thrust plate, and having spaced, independently operating raised resilient elevations distributed in a matrix having a plurality of elevations in orthogonal directions across the surface of said unitary supporting element and deflecting independently of the deflection of adjacent elevations in both orthogonal directions, said elevations resiliently supporting said bearing sheet on the backside thereof by engaging spaced portions at said backside, while permitting local deflections of said sheet to accommodate thermal and centrifugal deformation and transient excursions of said thrust runner under the influence of vibration, rotor orbiting, and loading fluctuations;
   said thrust runner being mounted for rotation relative to said bearing sheet and having a bearing surface facing said bearing surface on said bearing sheet, said bearing surfaces of said sheet and said thrust runner defining the two boundaries of the bearing interface;
   said bearing surface of said thrust runner having formed therein a hydrodynamic profile which, upon relative movement of said bearing surfaces, induces the formation of a hydrodynamic supporting gas film to separate and support said thrust runner on said bearing sheet.

7. The bearing defined in claim 6, wherein said bearing surface of said thrust runner has formed therethrough a pattern of openings for admitting pressurized lubricating fluid to said bearing interface for enhancing the hydrodynamic supporting gas film and providing a fluid supporting film before said hydrodynamic supporting gas film is formed and to enhance the load capacity and bearing stability thereafter.

8. The bearing defined in claim 7, wherein said hydrodynamic profile communicates with a fluid supply cavity having a floor in which said openings are located.

9. The bearing defined in claim 6, wherein said supporting element includes a plate having leaves defined by cuts in said plate around three sides of said leaves, said leaves being bent out of the plane of said plate and engaging said bearing sheet at said spaced portions on the backside thereof.

10. The bearing defined in claim 6, wherein said supporting element includes a plate having projections raised therefrom into engagement with said spaced portions on the backside of said bearing sheet, said projections displaying a gradient of stiffness in the radial direction.

11. A compliant fluid bearing, comprising:
two relatively movable members defining therebetween a gap;
a bearing assembly disposed in said gap and including a flexible bearing sheet and a resilient supporting element;
said supporting element lying between said bearing sheet and one of said members, operatively supported by said one member, and resiliently supporting said bearing sheet while permitting local deflections thereof to accommodate thermal and centrifugal deformation of said members and transient excursions thereof under the influences of vibration, rotor orbiting, and loading fluctuations;
said bearing sheet having a bearing surface facing a relatively moving bearing face on the other of said members, and a backside on the side opposite said bearing surface, said face and said surface defining the two boundaries of a bearing interface, said bearing sheet being supported on said backside by said supporting element;
said bearing face having formed therethrough a plurality of openings for fluid communication between said bearing interface and a source of externally pressurized lubricating fluid.

12. The bearing defined in claim 11, wherein said resilient support element includes a plate having raised, bump-form projections thereon, said bump-form projections engaging said backside of said bearing sheet.

13. The bearing defined in claim 12, wherein said bump-form projections are defined on three sides thereof by slits in said plate, one of said slits running parallel with the bump-form crest.

14. The bearing defined in claim 12, wherein said resilient support element has an edge extending parallel to the direction of motion of said other member relative to said bearing sheet, said bump-form projections on said resilient support element having a stiffness per unit area of said plate which is different at one edge from the stiffness per unit area of the projections of the central zone of said plate.

15. The bearing defined in claim 14, wherein said bearing face on said other member has formed therein a series of hydrodynamic profiles for generation of hydrodynamic supporting fluid films between said bearing face and said bearing surface, said openings communicating with said profiles for supplying lift-off lubricating fluid to said bearing interface during start-up and slow-down phases of the bearing operation, and for enhancement of the hydrodynamic supporting fluid film.

16. A method of supporting a rotating rotor, comprising the steps of:
pumping lubricating fluid under pressure into a manifold in the rotating rotor;
conveying said fluid through radial distribution conduits in said rotor to restrictions in said conduits;
feeding fluid through said resrictions to a plurality of hydrodynamic shaped recesses in a bearing surface on said rotor to provide a supporting cushion of hydrostatic pressurized fluid adjacent each of said recesses;
supporting a thin, flexible, stationary bearing sheet, in opposed bearing relationship to said rotor bearing surface, on a resilient, compliant support element;
supporting said support element on a stationary support member;
rotating said rotor relative to said sheet to generate supporting hydrodynamic pressurized fluid films to enhance the hydrostatic fluid cushions;
deflecting said bearing sheet in the presence of misalignment loads and thermal distortion to maintain the correct spacing between said rotor bearing surface and said bearing sheet; and
deflecting said bearing sheet in the vicinity of said films and cushions of pressurized fluid to optimize the load supporting capability of said bearing.

17. The method defined in claim 16, wherein said bearing sheet supporting step includes supporting said bearing sheet on a matrix of spaced support zones provided by a plurality of resilient supporting leaves bent out of plate, said leaves displaying a gradient of stiffness per unit area of said plate in the direction parallel to the plane of said plate and perpendicular to the direction of said rotor bearing surface relative to said bearing sheet.

18. The method defined in claim 16, wherein said bearing is a thrust bearing; said recesses are in a thrust runner; said support element is a plate having leaves cut around three sides and bent out of said plate into engagement with said bearing sheet; and said stationary support member is a thrust plate.

19. In a compliant hydrodynamic bearing having a flexible, smooth bearing sheet presenting a bearing surface to an opposed bearing surface of a rigid rotating member, and a resilient, compliant supporting element for supporting said bearing sheet from the side opposite the bearing surface thereof, the improvement comprising:
said supporting element being in the form of a thin metal plate having a series of resilient, compliant projections extending out of the plane of said plate, said projections including leaves bent out of the plane of said plate, said leaves being defined on the three sides thereof by a slit in said plate; whereby said leaves can deflect individually and independently of the other portions of said plate so that deflection of one of said leaves will not disturb the support offered by the other of said leaves.

20. The bearing defined in claim 19, wherein said bearing is a thrust bearing, and the distribution of said projections is substantially symmetrical about all bearing diameters, and said projections display a radial gradient of compliance provided by at least one of the size, shape and spacing of said projections.

21. The bearing defined in claim 19, wherein at least one of the spacing, size, and shape of said leaves varies across said plate to provide a gradient of stiffness in the direction perpendicular to the direction of movement of said rigid bearing element relating to said flexible bearing element and parallel to said plate.

22. The bearing defined in claim 19, wherein said rigid bearing element is a thrust runner, and said flexible bearing element is part of a thrust plate, and said support element is substantially symmetrical about any diameter thereof.

23. The bearing defined in claim 19, wherein said projections are in the form of a bump, with the crest of said bump being oriented perpendicular to the direction of rotation of the bearing surface of said rotating member.

24. The bearing defined in claim 19, wherein said supporting element is formed of a single plate of metal with said leaves extending into engagement with said bearing sheet over a regular matrix of support zones.

* * * * *